H. S. BLYNT.
INNER TUBE PROTECTOR FOR PNEUMATIC TIRES.
APPLICATION FILED JUNE 6, 1918.
1,285,604.  Patented Nov. 26, 1918.
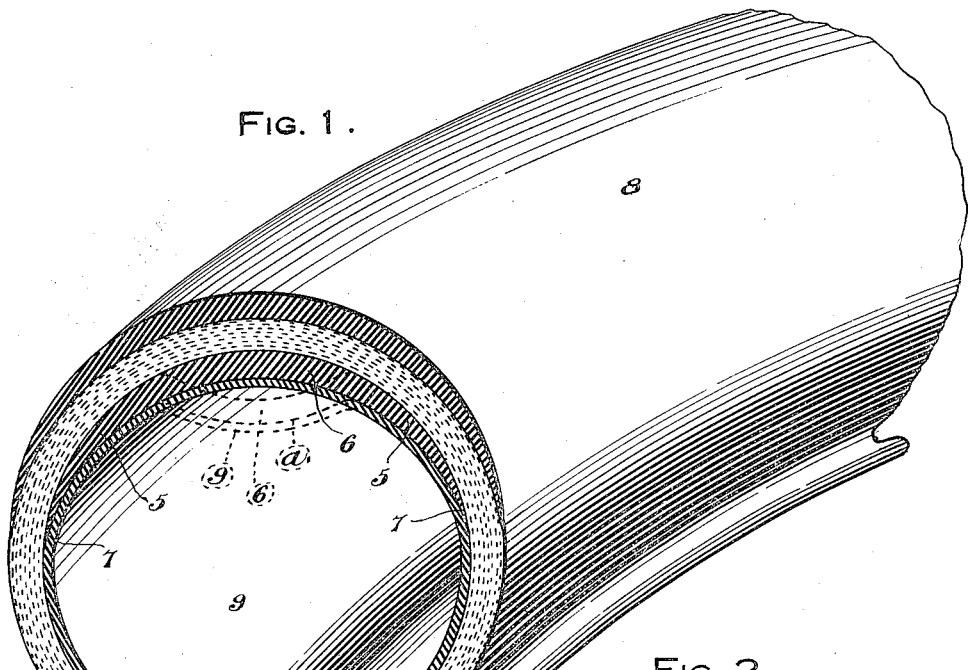
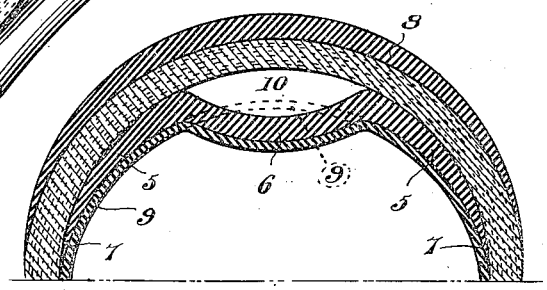
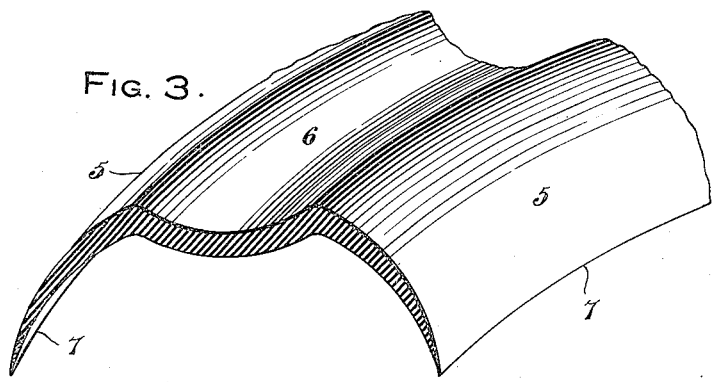
Inventor
H. S. Blynt
By A. M. Wilson
Attorney

UNITED STATES PATENT OFFICE.

HERBERT S. BLYNT, OF GALLIPOLIS, OHIO.

INNER-TUBE PROTECTOR FOR PNEUMATIC TIRES.

1,285,604.

Specification of Letters Patent.

Patented Nov. 26, 1918.

Application filed June 6, 1918. Serial No. 238,497.

*To all whom it may concern:*

Be it known that I, HERBERT S. BLYNT, a citizen of the United States of America, residing at Gallipolis, in the county of Gallia and State of Ohio, have invented certain new and useful Improvements in Inner-Tube Protectors for Pneumatic Tires, of which the following is a specification.

This invention relates to certain new and useful improvements in inner tube protectors for pneumatic tires, and relates more particularly to that class of inner tube protectors in the form of an endless band or ring adapted to be placed within a tire shoe between the inner surface thereof and the outer surface of the inner tube adjacent the tread portions thereof.

The primary object of this invention is to provide a protector for inner tubes in the form of an endless band of flexible material constructed to normally resume a shape whereby penetration thereof by pointed objects will be rendered practically impossible when in operative position to thereby prevent such pointed objects from puncturing the inner tube.

A further object of the invention is the provision of a protecting band for inner tubes formed of flexible material having an intermediate circumferential normally concaved portion which will be forced outwardly against the inner face of a tire shoe by expansion of the inner tube and which will resume its concaved form practically immediately upon being pressed by an object which has penetrated the outer shoe to thereby prevent said object from piercing or puncturing the inner tube.

With these general objects in view and others that will appear as the nature of the invention is better understood, the same consists in the novel form and construction of the device hereinafter more fully described, illustrated in the accompanying drawings and then claimed.

In the drawing forming a part of this application, and in which like reference characters refer to corresponding parts, throughout the several views, Figure 1 is a fragmentary perspective view of a tire casing, with my improved protector operatively arranged therein, between the same and a pneumatic inner tube, the normal position of the concaved portion of the protector and the adjacent portion of the inner tube being illustrated by dotted lines.

Fig. 2 is a transverse sectional view of the tread portion of a tire with the device positioned between the same and the tread portion of an inner tube, and illustrating the positions of the parts before the inner tube is entirely inflated and Fig. 3 is a fragmentary perspective view of the protecting ring or band detached.

Referring more in detail to the several views, the present protector is in the form of an endless band of flexible material such as rubber, rubber composition, cork, felt or the like having its marginal portions 5 of substantially arcuate form and connected by an intermediate concaved portion 6, the portions 5 gradually tapering to feather edges 7 from their points of connection to the portion 6. The band has the intermediate concaved portion 6 extended entirely throughout its circumferential length and during the manufacture of the device, the said portion 6 is formed so as to normally retain this concaved shape.

It is to be understood that the present protector is preferably made in one piece for any given sized tire and is adapted to fit snugly into the casing or shoe 8 as shown in Figs. 1 and 2 between the inner face of said shoe and the outer face of the inner tube 9 adjacent the tread portions thereof. After the protecting ring is inserted in this position, the marginal portions 5 will bear against the adjacent inner surface of the shoe 8 and the concaved portion 6 will be spaced from the inner surface of the shoe 8, thus leaving a cavity or air-pocket 10 between the shoe and the portion 6. The inner tube 9 is then inflated to expand the portion 6 and the inner tube to push the same outwardly against the outer shoe as shown in full lines in Fig. 1 from the dotted line position *a* therein or from the full line position shown in Fig. 2.

The width of the concaved portion 6 is preferably approximately one-seventh of the inside circumference of the shoe 8, although a narrower or wider width thereof may be practical.

When a tire having the present protector applied thereto, as above described, has a nail or tack driven into the same, by reason of the weight of the vehicle, equipped with the tire, said nail or tack, may comparatively readily penetrate the outer casing 8, but when it comes into contact with the protector at the portion 6, said portion will be forced back to its normal concaved shape against the pressure in the tube 9, thereby preventing penetration or puncture of said tube 9, it being understood that, by reason of the tendency of the portion 6 to return to its normal shape, it will take very little pressure of the nail or tack upon the portion 6 to move the same to its normal shape. Upon the next revolution of the wheel carrying this tire, the nail or tack will be bent and the protector will immediately go back to the position shown in full lines in Fig. 1, thus practically making puncturing of the inner tube 9 impossible at the tread portion thereof.

While the form of the invention herein shown and described is believed to be the preferable embodiment thereof, it is to be understood that minor changes may be made therein without departing from the spirit and scope of the invention as claimed.

What I claim as new is:—

1. An inner tube protector adapted for placement between a pneumatic tire shoe and a pneumatic inner tube consisting in an endless band of flexible material having spaced arcuate marginal portions connected by an intermediate circumferential normally depressed concaved portion, substantially as and for the purpose described.

2. An inner tube protector adapted for placement between a pneumatic tire shoe and a pneumatic inner tube consisting in an endless band of flexible material having spaced arcuate marginal portions connected by an intermediate circumferential normally depressed concaved portion, said marginal portions tapering substantially to free feather edges from their points of connection with the intermediate concaved portion, substantially as and for the purpose described.

In testimony whereof I affix my signature.

HERBERT S. BLYNT.